United States Patent
Wang et al.

(10) Patent No.: US 10,272,387 B2
(45) Date of Patent: Apr. 30, 2019

(54) MODIFIED FORWARD OSMOSIS MEMBRANE MODULE FOR FLOW REGIME IMPROVEMENT

(71) Applicant: TONGJI UNIVERSITY, Shanghai (CN)

(72) Inventors: Qiaoying Wang, Shanghai (CN); Jie Wang, Shanghai (CN); Zhiwei Wang, Shanghai (CN); Zhichao Wu, Shanghai (CN); Yanqiang Ma, Shanghai (CN); Xueye Wang, Shanghai (CN); Chen Pan, Shanghai (CN); Mei Chen, Shanghai (CN); Zimeng Li, Shanghai (CN); Kaili Yan, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 124 days.

(21) Appl. No.: 15/363,203

(22) Filed: Nov. 29, 2016

(65) Prior Publication Data
US 2017/0072366 A1   Mar. 16, 2017

(30) Foreign Application Priority Data
May 6, 2016   (CN) .......................... 2016 1 0295051

(51) Int. Cl.
*B01D 61/00*   (2006.01)
*B01D 65/08*   (2006.01)

(52) U.S. Cl.
CPC ........... *B01D 61/002* (2013.01); *B01D 65/08* (2013.01); *B01D 2313/08* (2013.01); *B01D 2313/16* (2013.01); *B01D 2313/54* (2013.01)

(58) Field of Classification Search
CPC ............ B01D 2313/08; B01D 2313/16; B01D 2313/54; B01D 61/002; B01D 65/08
See application file for complete search history.

(56) References Cited

U.S. PATENT DOCUMENTS

2014/0263025 A1* 9/2014 Maxwell .............. B01D 69/148
                                                    210/321.74

FOREIGN PATENT DOCUMENTS

CN    103801195    5/2014
CN    204159217    2/2015

OTHER PUBLICATIONS

Cornelissen, E R., et al., "Membrane Fouling and Process Performance of Forward Osmosis Membranes on Activated Sludge", Journal of Membrane Science 319 (2008) 158-168.

* cited by examiner

*Primary Examiner* — Dirk R Bass
(74) *Attorney, Agent, or Firm* — Hauptman Ham, LLP

(57) ABSTRACT

To provide a modified forward osmosis (FO) membrane module for flow regime improvement, the FO membrane module includes but not limited to: a water inlet; a water outlet; a forward osmosis (FO) membrane; a frame; and folded plates for improving flow regime in which draw solution is introduced into the water inlet of membrane module, then flowed through flow channels composed by three opposite folded plates vertically arranged on upper and bottom portions of the frame alternatively along horizontal direction with equal space; and drawn out from the water outlet. The flow regime improvement is achieved by increasing number of flow-guide folded plate, which results in the decrease of internal concentration polarization and membrane fouling. Structure of frame is modified to improve flow regime and to satisfy requirement of convenient and reliable connections between numbers of membrane modules in the FO membrane system.

6 Claims, 3 Drawing Sheets

MODIFIED FORWARD OSMOSIS MEMBRANE MODULE FOR FLOW REGIME IMPROVEMENT

TECHNICAL FIELD

The present disclosure relates to technical field of membrane separation, more particularly, to a modified forward osmosis membrane module for flow regime improvement.

BACKGROUND OF THE INVENTION

In the past thirty years, membrane bioreactor (MBR) combining membrane separation and biotreatment processes together has been attracted broad attention from domestic and overseas research institutions. The external pressure is needed to be the driving force of permeate in traditional MBRs, such as reverse osmosis, nano-filtration, ultra-filtration, and micro-filtration etc. Although these external pressure driving membrane separation processes have advantages, the energy consumption is huge due to the application of external pressure, meanwhile, heavy membrane fouling is often accompanied with these membrane separation processes, leading to lower operating efficiency. All mentioned above are main restrictions of large scale application of MBR in wastewater treatment field.

To solve problems mentioned above, Cornelissen developed an osmosis membrane bioreactor (OMBR) using osmotic pressure as driving force for the first time. In OMBR, the forward osmosis (FO) membrane is adopted as separation medium and the permeate is driven by osmotic pressure instead of external pressure, and the membrane fouling is greatly reduced comparing to these membrane processes using external pressure because operating pressure is decreased. Removal rate of COD and $NH_4^+$—H of OMBR system could reach more than 95% to obtain high quality effluent. Besides, high recovery rate by hydraulic cleaning and retention rate of pollutants of the OMBR system are the incomparable advantages comparing to other membrane separation processes. Therefore, research on theory and practical application of OMBRs shows a promising future to break through the bottlenecks of traditional MBRs such as high energy consumption, heavy fouling etc., and OMBR process is considered to be an advanced technology with high efficiency for domestic water treatment.

In the OMBR system, water molecule is driven into draw solution side by high osmosis pressure through FO membrane from sludge mixed liquid side with low osmosis pressure, and the diluted draw solution is recycled by reverse osmosis or other physical or chemical separation methods. Recent years some reports have verified the higher efficiency and feasibility of OMBR process, which provides sound theoretical foundation for its practical application.

However, during practical application, it has been found that the actual membrane flux is lower than theoretical flux in FO membrane system by using osmosis pressure difference as driving force, which is mainly due to the existence of concentration polarization especially the internal concentration polarization. Therefore, it's important to optimize the structure of membrane modules in order to mitigate the negative effects of internal concentration polarization on membrane permeation flux. Hanmin ZHANG etc. have provided a modified FO membrane module and application thereof in which metallic mesh is displaced between two FO membranes with more uniform water distribution, while secondary pollution is brought because metallic ions was released into membrane chamber and liquids during the long-term application (Chinese Patent Application Publication No: CN103801195A). Zhong REN etc. have provided FO membrane modules and subassembly thereof and a flat plate is used to divide membrane chamber into upper flow region and bottom flow region, however, dead angles of flow regime are easily generated in this module (Chinese Patent No: CN204159217U).

To conclude, the present disclosure addresses the higher convenience and efficiency method to mitigate the concentration polarization of FO membrane.

SUMMARY OF THE INVENTION

The present disclosure aims to change structure of traditional FO membrane module by adding internal flow-guide folded plates to increase internal liquid disturbance and reduce internal concentration polarization; the structure of frame of the said FO membrane module is modified in order to increase the permeability.

The FO membrane module includes but not limits in: a water inlet pipe, a water outlet pipe, a frame of modularized membrane module, a FO membrane and internal folded plates.

The internal folded plates for improving flow regime are mounted inside the membrane module. When the number of folded plates are more than one, they are alternately mounted on the top-border and bottom-border, and two of which are arranged as peaks facing peaks and valleys facing valleys. The draw solution flows through the channels between two folded plates and shrunken-enlarged flow is formed in turn to improve flow regimes by generating vortex. The vortex promotes internal mixture of solution and mitigates concentration polarization of membrane surfaces.

An angle of internal folded plates is 60°-420°; flow rate is optimized to be 20 cm·s$^{-1}$ at peaks of said internal folded plates, and 5 cm·s$^{-1}$ at valleys of said internal folded plates; Materials of said internal folded plates are Acrylonitrile Butadiene Styrene (ABS) plastic/polymethyl methacrylate (PMMA).

An air vent is set on the very top part of folded plates mounted on the top-border, to help to discharge the air inside the membrane modules from outlet and avoid air accumulation which may cause short stream of the liquid.

An intercommunicating hole is set at connection part of bottom-border and folded plates mounted on bottom-border to reduce flow shocks on the folded plates, and to improve flow regime of very bottom of FO membrane module to avoid dead angle.

The frame is designed with same shape with said flow-guide folded plates to make every flow channel as complete opposite folded plate form. Said frame has an asymmetrical structure with two surfaces A and B matching each other to meet requirement that a plurality of membrane modules could be firmly assembled together.

Beneficial effects of this disclosure are briefly described as follows: traditional flat plates FO membrane components are modified by adding the opposite folded plates inside the membrane chambers, and peaks of two adjacent folded plates are arranged to be face-to-face. A shrunken-enlarged flow regime in turn is gained by this arrangement of said internal folded plates aiming to improve flow regime of draw solutions by generating vortex and mitigate concentration polarization of membrane surfaces by enhancing mass transfer, and thus to increase operating permeate flux of FO membrane module. A and B surfaces are designed to be matched each other to get reliable installment of different membrane modules. For example, A surface of frame of

LIST OF REFERENCE NUMBERS

1—water input, 2—water outlet, 3—FO membrane, 4—A border of modularized membrane module, 5—B border of modularized membrane module, 6—internal folded plate for improving flow regime, 7—air vent, 8—intercommunicating hole.

DETAILED DESCRIPTION OF THE INVENTION

The present disclosure relates to structure design of a forward osmosis (FO) membrane module for improving internal flow regime. Number of internal flow-guide folded plates is increased to get better flow regime by increasing the disturbance of flow and decreasing internal concentration polarization and membrane fouling. Described herein are improved designs of frame providing enhanced flow regime as well as reliable and convenient joint of numbers of membrane components.

In the following content, aspects and features of the modified forward osmosis membrane module for flow regime improvement will be described in detail with reference numbers to the drawings:

As shown in FIG. 1-4, a forward osmosis membrane module for improving flow regime includes but is not limited to: 1—water input, 2—water outlet, 3—FO membrane, 4—A border of modularized membrane module, 5—B border of modularized membrane module, 6—internal folded plate for improving flow regime, 7—air vent, and 8—intercommunicating hole. Said water input 1 and water outlet 2 are set on left and right end of top-border of modularized membrane module respectively. FO membrane 3 is adhered to front and back surface of said frame of modularized membrane module, folded plates for improving flow regime are alternately mounted on the top-border and bottom-border of said frame alternatively along horizontal direction with equal space.

An air vent is set at on the very top connection part of frame and upper folded plates mounted on the top-border, to help exhaust air to discharge the air from inside the membrane modules from outlet and avoid air accumulation which may cause short stream of the liquid. The intercommunicating hole 8 is set on the connection part of said folded plate for improving flow regime mounted on the bottom-border of said frame and said frame of FO membrane module to reduce flow shocks on folded plates, improve flow regime at the bottom of FO membrane module and avoid dead angle of flows. A folding angle of folded plates is set to be 60°-120°; and flow rate is set to be 20 cm·s$^{-1}$ and 5 cm·s$^{-1}$ at peaks and valleys of the folded plates, respectively. Materials of said folded plates are ABS plastic or PMMA.

Figure 4:
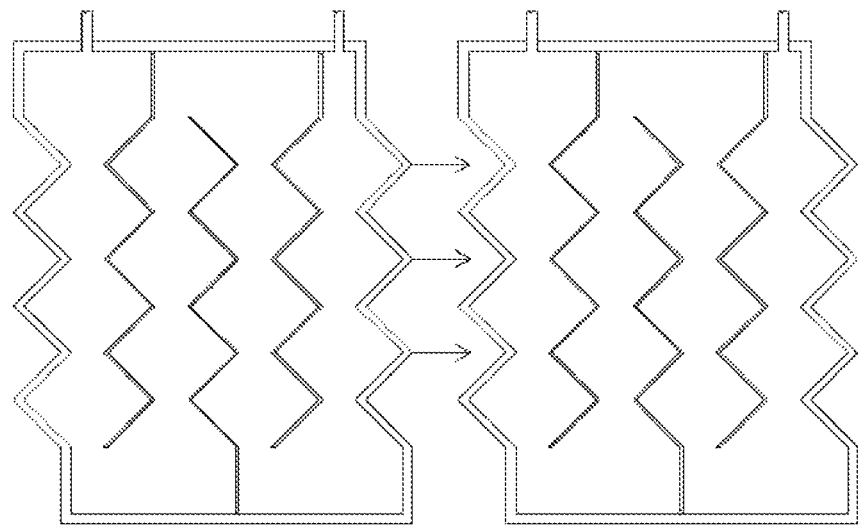
FIG. 4(a).(b) shows the structure and assembly of frame of the FO membrane module according to an embodiment of the present disclosure.
Figure 4B:
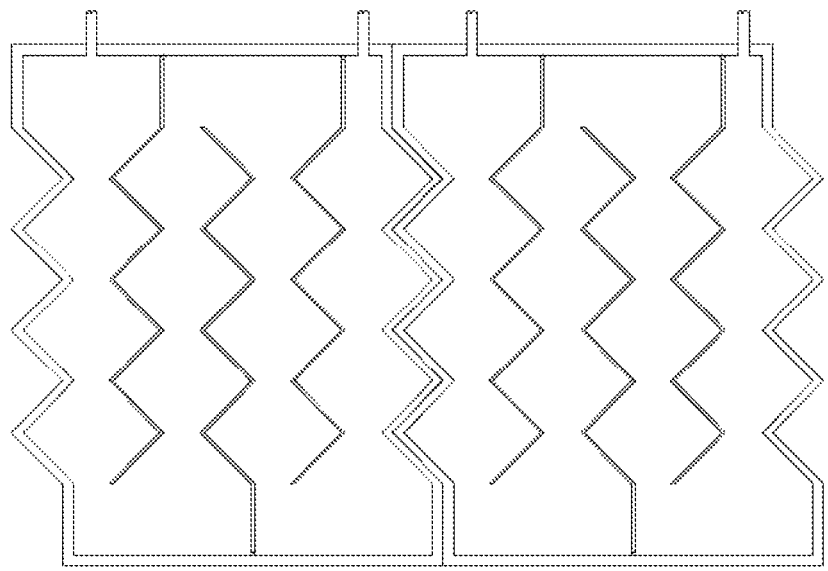

Said structure of frame of modularized membrane module is same with the folded plate as shown in FIG. 4, to improve flow regime in inlet channels and outlet channels, respectively. A border is designed to be matched with B border of the frame to firmly connect different modules in the FO membrane module.

Figure 1:
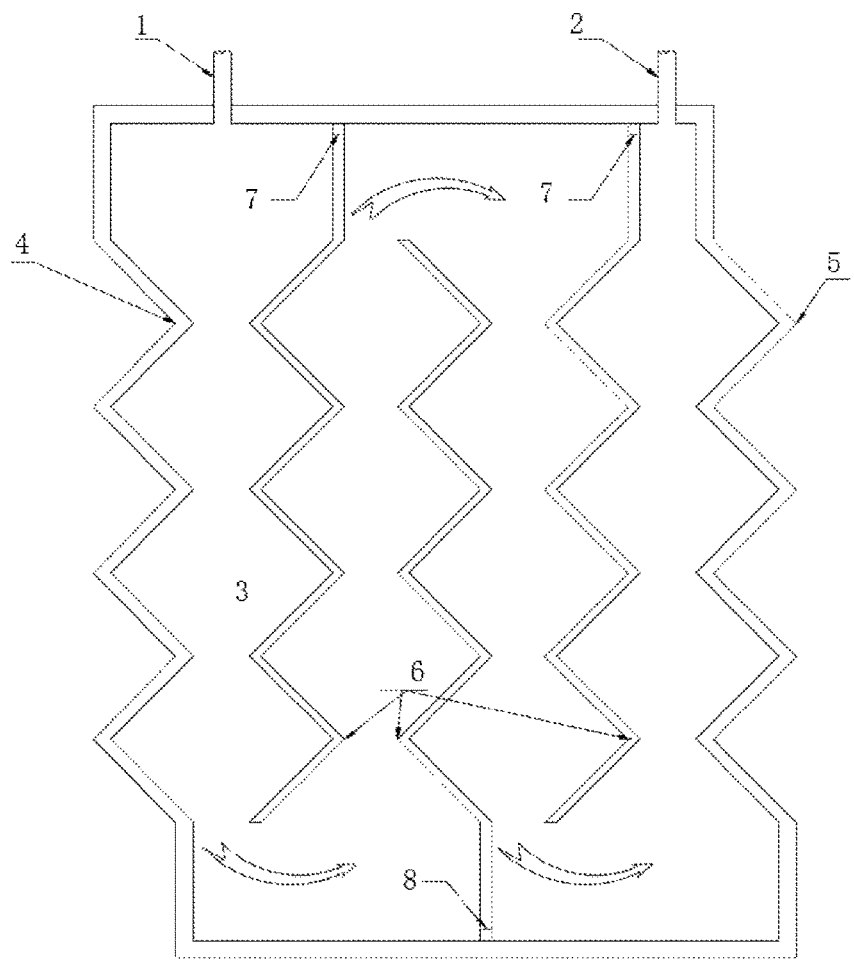
FIG. 1 shows the scheme of a FO membrane module according to an embodiment of the present disclosure.
Figure 2:
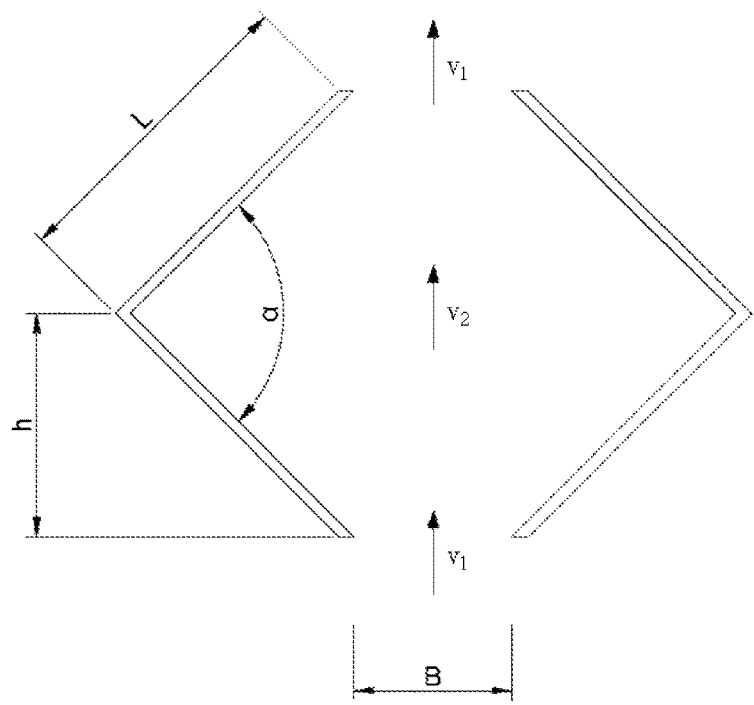
FIG. 2 shows the scheme of the internal folded plates of FO membrane module according to an embodiment of the present disclosure.
Figure 3:
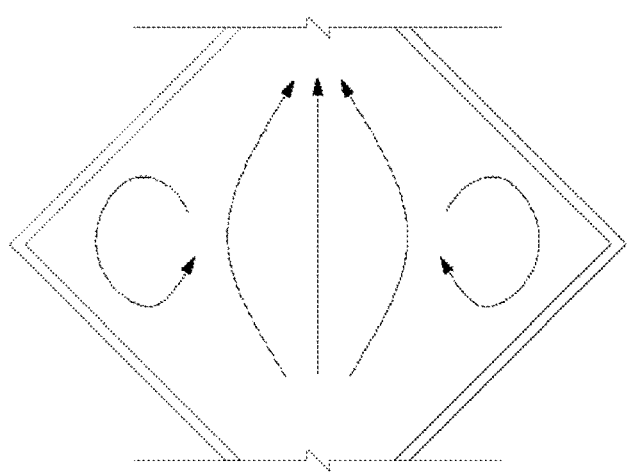
FIG. 3 shows the flow regime between membrane components such as internal folded plates of the FO membrane module according to an embodiment of the present disclosure.

As shown in FIG. 1, draw solution is introduced into said inlet of membrane module, passed through the channels composed by the opposite folded plates vertically arranged inside of frame of the modularized membrane module subsequently, and then drawn out through said water outlet. The peaks of two close folded plates are displaced to be face-to-face and so are valleys. Shrunken-enlarged flow is formed in turn to improve flow regimes in the channels of folded plates by generating vortex. The vortex promotes internal mixture of liquids and mitigates concentration polarization of membrane surfaces.

EMBODIMENTS

The present invention will be further described below with reference to specific examples. However, these examples should not be construed to limiting the scope of the present invention.

Example 1

Activated sludge collected from a water treatment plant is put into OMBR to be acclimated, and the FO membrane module prepared according to the present disclosure was used. Draw solution are introduced into membrane chamber through water inlet 1 by peristaltic pump; then orderly passed through three flow channels composed by A border of frame of modularized membrane module 4 and folded plate for improving flow regime 6, two close folded plates for improving flow regime 6, folded plate for improving flow regime 6 and B border of frame of modularized membrane module 5 respectively; and finally drawn out through water outlet 2. Wherein, water quality of input sludge mixed liquid are as follows: COD=522±21 mg·L$^{-1}$, TN=41±5 mg·L$^{-1}$, NH$_4^+$—N=37±4 mg·L$^{-1}$, NO$_3$—N=4±1 mg·L$^{-1}$, TP=4±1 mg·L$^{-1}$.

Parameters of the FO membrane module in Example 1 are: folding angle is 60°, flow velocity of peaks is 20.2 cm·s$^{-1}$, and flow velocity of valleys is 4.6 cm·s$^{-1}$.

Operating parameters of the FO membrane module in Example 1 are: water temperature is 16.2° C., pH=6.5; draw solution is 1M NaCl; and stable operating flux is 7.4 LMH.

Treated water quality is: COD, TN, NH$_4^+$—N, NO$_3$—N, and TP all are not detected.

Example 2

Activated sludge collected from a water treatment plant is put into OMBR to be acclimated, and the FO membrane module prepared according to the present disclosure was used. Draw solution are introduced into membrane chamber through water inlet 1 by peristaltic pump; then orderly passed through three flow channels composed by A border of frame of modularized membrane module 4 and folded plate for improving flow regime 6, two close folded plates for improving flow regime 6, folded plate for improving flow regime 6 and B border of frame of modularized membrane module 5 respectively; and finally drawn out through water outlet 2. Wherein, water quality of input sludge mixed liquid are as follows: COD=522±21 mg·L$^{-1}$, TN=41±5 mg·L$^{-1}$, NH$_4^+$—N=37±4 mg·L$^{-1}$, NO$_3$—N=4±1 mg·L$^{-1}$, TP=4±1 mg·L$^{-1}$ Parameters of the FO membrane module in Example 2 are: folding angle is 90°, flow velocity of peaks is 20.2 cm·s$^{-1}$, and flow velocity of valleys is 5.4 cm·s$^{-1}$.

Operating parameters of the FO membrane module in Example 1 are: water temperature is 16.4° C., pH=6.4; draw solution is 1M NaCl; and stable operating flux is 8.0 LMH.

Treated water quality is: COD, TN, NH$_4^+$—N, NO$_3$—N, and TP all are not detected.

Example 3

Activated sludge collected from a water treatment plant is put into OMBR to be acclimated, and the FO membrane module prepared according to the present disclosure was used. Draw solution are introduced into membrane chamber through water inlet 1 by peristaltic pump; then orderly passed through three flow channels composed by A border of frame of modularized membrane module 4 and folded plate for improving flow regime 6, two close folded plates for improving flow regime 6, folded plate for improving flow regime 6 and B border of frame of modularized membrane module 5 respectively; and finally drawn out through water outlet 2. Wherein, water quality of input sludge mixed liquid are as follows: COD=522±21 mg·L$^{-1}$, TN=41±5 mg·L$^{-1}$, NH$_4^+$—N=37±4 mg·L$^{-1}$, NO$_3$—N=4±1 mg·L$^{-1}$, TP=4±1 mg·L$^{-1}$ Parameters of the FO membrane module in Example 3 are: folding angle is 120°, flow velocity of peaks is 20.2 cm·s$^{-1}$, and flow velocity of valleys is 6.7 cm·s$^{-1}$.

Operating parameters of the FO membrane module in Example 3 are: water temperature is 16.7° C., pH=6.4; draw solution is 1M NaCl; and stable operating flux is 7.6 LMH.

Treated water quality is: COD, TN, NH$_4^+$—N, NO$_3$—N, and TP all are not detected.

Although the above aspects and embodiments are described separately for convenience and clarity, it is contemplated that the above aspects and embodiments may be combined without departing from the scope of the present disclosure.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods and techniques that are insubstantially different from those described above and/or in the appended claims are also intended to be within the scope of the disclosure.

The invention claimed is:

1. A forward osmosis (FO) membrane module, comprising:
    a water inlet;
    a water outlet;
    two forward osmosis membranes;
    a frame;
    internal folded plates, wherein at least one of the internal folded plates is for improving a flow regime;
    an air vent; and
    an intercommunicating hole,
    wherein:
    said water inlet, said two forward osmosis membranes, said internal folded plates and said water outlet are set on the frame forming a modularized membrane module,
    a first forward osmosis membrane of said two forward osmosis membranes is set on a front side of the frame and a second forward osmosis membrane of said two forward osmosis membranes is set on a back side of the frame to make a fluid feed space, and
    said air vent is set on a connecting part of at least one of the internal folded plates and the frame, said air vent is configured to vent air built up within the modularized membrane module through the water outlet,
    wherein a draw solution is introduced into the modularized membrane module through said water inlet, then flown through flow channels composed by the internal folded plates vertically arranged on upper and bottom portions of said frame alternatively along a horizontal direction with equal space, and then drawn out from the water outlet.

2. The forward osmosis membrane module of claim 1, wherein each of said internal folded plates is an opposite folded plate with peaks and valleys, the modularized membrane module consists of three opposite folded plates configured to improve the flow regime and to generate a vortex.

3. The forward osmosis membrane module of claim 1, wherein two borders of said frame have folded plate components configured to promote the flow regime of an inlet flow channel and an outlet flow channel defined by said frame and said internal folded plates, said two borders named A border and B border, the A border and the B border matching each other for joining the FO membrane module with another FO membrane module.

4. The forward osmosis membrane module of claim 2, wherein said intercommunicating hole is set on a connecting part of at least one of the internal folded plates and the frame of the modularized membrane module at a bottom thereof.

5. The forward osmosis membrane module of claim 1, wherein a folding angle of each of said internal folded plates is 60-120°, through which a vortex is formed in the flow channel defined by said internal folded plates for improving the flow regime to get better mixture of liquids.

6. The forward osmosis membrane module of claim 3, wherein said two borders of said frames with said folded plate components are symmetric with respect to each other for improving the flow regime.

* * * * *